United States Patent [19]

Kita

[11] Patent Number: 4,750,109

[45] Date of Patent: Jun. 7, 1988

[54] METHOD AND SYSTEM FOR EXPEDITING MULTI-PACKET MESSAGES IN A COMPUTER NETWORK

[75] Inventor: Kouichi Kita, Nishi-Nasuno, Japan

[73] Assignee: Kabushiki Kaisha Toshiba, Kawasaki, Japan

[21] Appl. No.: 687,241

[22] Filed: Dec. 28, 1984

[30] Foreign Application Priority Data

Dec. 28, 1983 [JP] Japan .................................. 58-245167

[51] Int. Cl.⁴ ................................................ H04J 6/00
[52] U.S. Cl. ........................................ 364/200; 370/94
[58] Field of Search ... 364/200 MS File, 900 MS File; 340/825.5; 370/85, 89, 94

[56] References Cited

U.S. PATENT DOCUMENTS

| | | | |
|---|---|---|---|
| 4,223,380 | 9/1980 | Antonaccio et al. | 364/200 |
| 4,281,380 | 7/1981 | DeMesa, III et al. | 364/200 |
| 4,387,425 | 6/1983 | El-Gohary | 364/200 |
| 4,410,889 | 10/1983 | Bryant et al. | 370/94 |
| 4,472,787 | 9/1984 | Busby | 364/900 |
| 4,493,021 | 1/1985 | Agrawal et al. | 364/200 |
| 4,514,843 | 4/1985 | Albanese | 370/85 |
| 4,539,677 | 9/1985 | Lo | 370/94 |
| 4,593,282 | 6/1986 | Acampora et al. | 340/825.5 |

OTHER PUBLICATIONS

Computer Networks, Andrew S. Tanenbaum, Englewood Cliffs, N.J. "The Network Layer III: Local Networks", pp. 286-295.

*Primary Examiner*—Archie E. Williams, Jr.
*Assistant Examiner*—Michael J. Ure
*Attorney, Agent, or Firm*—Oblon, Fisher, Spivak, McClelland & Maier

[57] ABSTRACT

A data communication computer network system is arranged to interconnect autonomous computers with a shared single communication channel to provide point-to-point communication between a plurality of computers. Each computer is connected to a channel control means coupled to the shared channel for establishing and removing the point-to-point communication line. Once a point-to-point communication line is established between a source computer and a designated destination computer, all the information, in the form of data packets, to be transmitted therebetween is transmitted without interruption, by means of successive transmission of the data packets.

7 Claims, 5 Drawing Sheets

METHOD AND SYSTEM FOR EXPEDITING MULTI-PACKET MESSAGES IN A COMPUTER NETWORK

BACKGROUND OF THE INVENTION

1. Field of the Invention

The present invention relates to a method for exchanging a large amount of information in a computer network which is an collection of autonomous computers interconnected by communication networks.

2. Description of the Prior Art

It is known to have a communication subnet (hereinafter referred to as a subnet) connect a plurality of computers each including an interface and a CPU intended for running user program, which are called hosts in computer network shown in FIG. 1. The function of the subnet is to carry messages (data) from host to host. The subnet consists of two basic components, i.e., Interface Message Processors (hereinafter referred to as 1F) serving as switching elements and numerous cables or leased telephone lines connecting a pair of 1Fs as transmission lines (hereinafter referred to as channel).

There are two general types of designs for the subnet: (1) a Point-to-point subnet, and (2) a Shared-transmit/receive subnet. In a point-to-point subnet a pair of 1Fs are connected by each channel, and if two 1Fs that do not share a cable nevertheless wish to communicate, they must do so indirectly, via other 1Fs. When a message is sent from one 1F to another via one or more intermediate 1Fs, the message is received at each intermediate 1F, stored there until the required output line is free, and then forwarded. Shown in FIG. 2, a computer network consists of four computers each having three 1Fs respectively for communicating with another three computers, with each interconnected pair of 1Fs connected by means of respective cables. In this design the number of 1Fs and cables increases corresponding to the increase in the number of computers to be interconnected, and results in an increase in the construction cost of such computer networks.

The second kind of communication systems involves a shared-transmit/receive channel. In these systems there is a single communication channel shared by all 1Fs of plural computers, and messages sent by any 1F are received by all other 1Fs. It has some arbitration mechanism to resolve conflicts when two or more 1Fs want to transmit simultaneously. If there are n 1Fs corresponding to the number of the computers, n(n−1) cables could be allocated for communication.

There are several possibile ways to implement shared-transmit/receive systems. One is a bus networks shown in FIG. 3, which includes a number of computers having respective 1Fs for communication, each 1F connected to a single communication cable by a respective cable. In a bus network, at any instant one computer is the bus master and is allowed to transmit, all other computers are required to refrain from sending data. A bus network must have some arbitration mechanism to resolve conflicts when two or more 1Fs want to transmit simultaneously.

Another shared-transmit/receive system is the ring network shown in FIG. 4. The ring network is basically a passive, electrically connected cable onto which all stations tap. In other words, a ring net is actually a series of point-to-point cables between consecutive stations.

Computer networks are required to take a raw transmission facility and transform it into a communication line that appears free of transmission errors to the networks. It accomplishes this task by breaking the data to be sent up into data frames, i.e , into physical-layer-service-data-units, transmitting the frames sequentially, and processing the acknowledgement frames sent back by the receiver. The units of information exchanged and routed within the network are called packets.

Most networks are organized as a series of layers, which are categories of functions and associated communications. The purpose of each layer is to offer certain services to the higher layers, and a layer of one computer carries on a conversation with a layer of another computer. The rules and conventions used in this conversation are collectively called the protocol of the layer. For example, there is the physical layer where raw bits of the information are transmitted over a communication channel at the lowest layer, the network layer which controls the operation of the network, the session layer which is the user's 1F into the network and performs certain transformations on the data, the transport layer which is the host (computer)-host (computer) layer and accepts data from the session layer, divides it into smaller units, passes the smaller units to the network layer, and ensures that the pieces all arrive correctly at the other en computer, and the application layer which is up to the individual user at the highest layer. The function of the transport layer is to deliver messages in the order in which they are sent over a virtual point-to-point channel, or broadcast messages to multiple destinations. This transport layer takes care of establishing and deleting connections across the network.

Multiple network connections for data communication are established by some kind of switching. One switching method is circuit switching in which the connection, which can be via a telephone system, between the source computer and the destination computer is once established and continued until the transmission of a data frame is finished. An alternative switching is message switching in which no physical path is established in advance between sender and receiver. With message switching, a message in the form of a data packet is sent from the 1F of one computer to that of another via one or more intermediary computer 1F's. The packet addressed to the respective designation 1F is received at each intermediary 1F, stored there until the required output line directed to the designation computer is free, and then forwarded. Another possibility is packet switching which allows one packet of a multipacket message to be forwarded before the subsequent one has fully arrived. However, with message switching, a single block of data may tie up an 1F-1F line including many intermediary computers between the sender computer and the receiver computer for many minutes, and therefore it renders message switchin useless for interactive communication. For these reasons, computer networks are usually packet switched, or occasionally circuit switched, but never message switched. Circuit switching networks are well suited to handling large amounts of data like image data, but with circuit switching, any unused circuit is wasted. The advantage of packet switching is that it is utilized by other packets from unrelated sources going to unrelated destinations, because circuits are never dedicated. However the overhead associated with the establishment of a virtual circuit will be large compared with the total transmission time. The disadvantage of circuit switching over packet switching is that the transmission efficiency is lower because the circuit once set up will be held until the transmission is finished.

For arbitration among several competing requests for the channel within the network, there are some different kinds of protocol. One protocol is a carrier sense multiple access collision detection (hereinafter referred to as CSMA/CD) protocol in which computers listen for a carrier and act to the multiple computer accordingly. When a host has data to send, it first listens to the channel to see if anyone else is transmitting. If the channel is busy, the host waits until it becomes idle. When the host detects an idle channel, it transmits a packet. At the time the host has finished transmitting its packet, any other host having a packet to send may now attempt to do so. If two or more hosts decide to transmit simultaneously, there will be a collision. Each host will detect the collision, abort its transmission, wait a random period of time, and then try again, assuming that no other station has started transmitting in the meantime.

An alternative is a ring network in which a special pattern, called a token, circulates around the ring as shown in FIG. 4 whenever all hosts are idle. When a host wants to transmit a packet, it is required to seize the token and remove it from the ring before transmitting. The 1F of the host monitors all bits that pass by in order to remove the token. As the last bit of the token passes by, a ring interface redefines the token by changing the token into another bit pattern, known as a connector. Immediately after the token has been so transformed, the host making the transformation is permitted to begin transmitting.

In case of transmitting large amounts of data like image data, it is needed to send each of multiframe data by breaking the data into individual frames in order to avoid causing transmission errors in the received frame.

The existing LAN (Local Area Network) is the shared transmit/receiver channel network employing packet switching. Therefore, when a host has large amount of data including many frames to send, it is required to be allowed to connect to the shared channel every frame, and then begin transmitting. It takes times to send each frame according to the protocol, and actual data transmission time per total transmission time decreases corresponding to the amount of data to be sent. Further data transmission between the source and the designation computer may be interrupted because of a busy channel depending upon the channel capacity. Ultimately, a deadlock is caused in the computer network, in which the first 1F cannot proceed until the second 1F does something, and the second 1F cannot proceed because it is waiting for the first 1F to do something. Both 1Fs have ground to a complete halt and will stay that way indefinitely.

Further, a transmission error caused by a variety of different noises being introduced to the frame is detected using error detecting codes, and corrected using error correcting codes. It also takes time to have the bad blocks of data retransmitted after being allowed to transmit data depending on the load of channel.

Furthermore, when the transmission rate in the source computer having data to send is different from the reception rate in the designation computer, it damages the frame because of an incomplete transmission. This raises a reliability problem in the communication networks.

For achieving reliable, efficient communication between the source and designation computers connected by a communication channel, there are some protocols used in the data link layer, which deal with the frame containing control information in addition to the message (data) to be transffered without errors. One such protocol is a High-level Data link Control which is limited to use for the point-to-point channel network or the point-to-multipoint channel network. These methods do not sufficiently resolve the problems of transmission error, and efficient communication.

In recent times, the need to develop computer networks capable of data transmission between multipoint-to-multipoint channels used by Local networks has increased, and in particular, there is a real need for a method for exchanging a large amount of information efficiently, and free of error in the computer network.

SUMMARY OF THE INVENTION

It is accordingly an object of the present invention to provide an improved method for exchanging a large amount of information in a computer network which is an collection of autonomous computers interconnected by communication networks.

More specifically, an object of the present invention is to provide an improved method for exchanging a large amount of information using a communication network having a multipoint-to-multipoint architecture.

A still further object of the present invention is to provide a method which enables sending of multiframe data successively to a designated computer with improved efficiency of communication.

A still further object of the present invention is to provide a method which employs a shared-transmit/-receive subnet capable of successively communicating multiframe data to achieve efficient communication among the computers of the computer network and to achieve error free data transmission.

These and other objects are achieved in accordance with the invention by providing a novel method and system for exchanging a large amount of information in a computer network including a collection of autonomous computers interconnected by a shared single communication channel, wherein the channel is checked to determine if it is idle, a designated receiving computer (hereinafter interchangeably called a "destination" or a "designation" computer) is checked to determine whether the destination computer is ready to receive information from a source computer, and if so, a point-to-point communication line is established between the designated computer and the source computer such that information is then transmitted. Information transmission is terminated upon completion of the transmission, whereupon the point-to-point communication line and the shared channel is then monitored again for availability for further data transmissions.

As above described, the present invention provides a method and system for exchanging information in computer network employing a shared-transmit/receive subnet in which packet switching is used for data communication, wherein a point-to-point communication line is established between the source computer and destination computer. According to the present invention, it is possible to eliminate times to send each frame (packet) according to the predetermined protocol required in the shared transmit/receiver channel network employing packet switching, and to improve transmission efficiency because once the point-to-point communication line between the source and destination computer is established, it is preserved until the whole of the data is sent out from the source computer to the destination computer. Stated differently, once the point-to-point communication line is established, according to the invention, all subsequent packets addressed to the same destination computer are sent successively, without interruption, through the already established point-to-point communication line. Further, according to the invention, establishment and removing of the point-to-point communication line between two computers depends upon the status of the shared channel, and are controlled in accordance with monitoring of the shared channel.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENT

Reference will now be made in detail to the present preferred embodiment of the subject invention as illustrated in the accompanying drawings.

Figure 5:
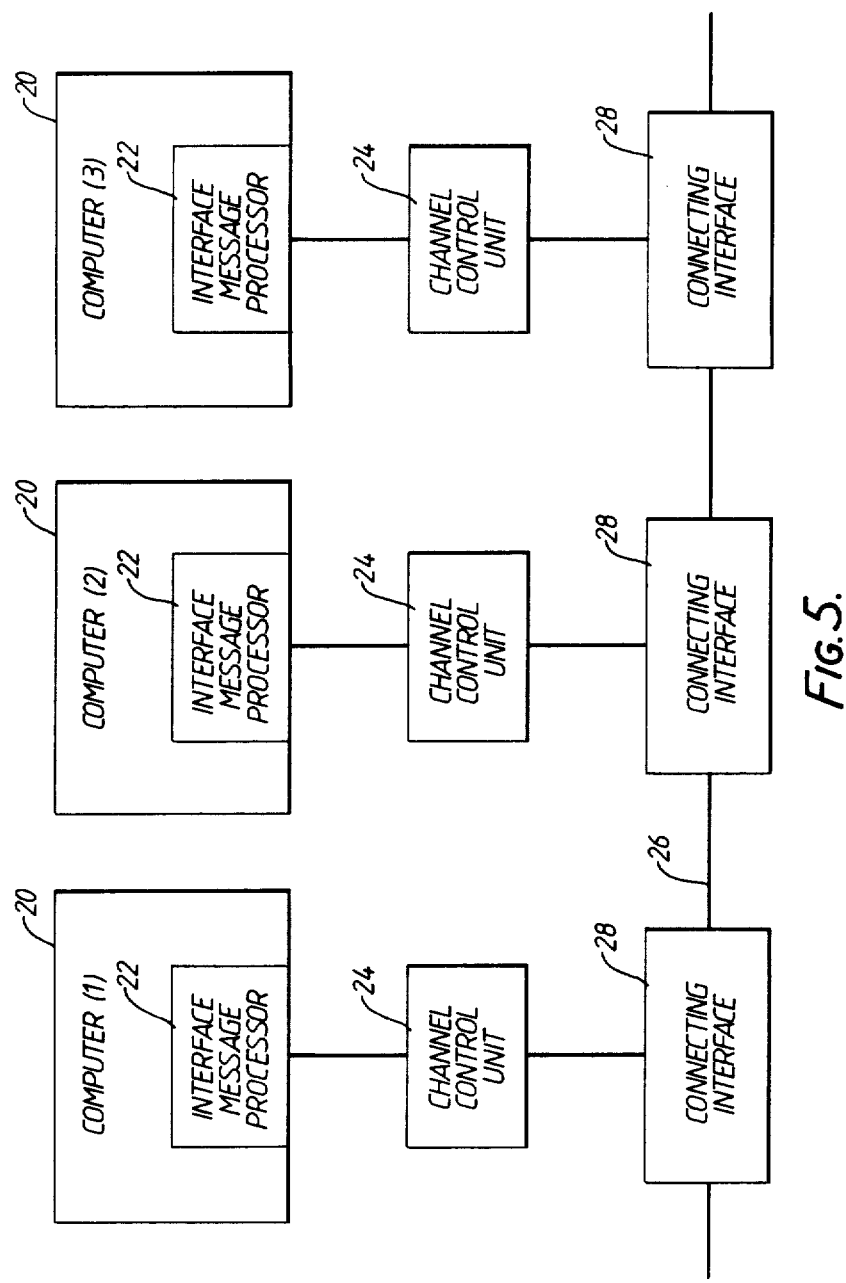
FIG. 5 is a system diagram illustrating the teachings of the present invention.

Simply stated, the subject invention includes a method for exchanging information between a source and destination computer pair on a point-to-point line established in the computer network as shown in FIG. 5.

A first step of the present invention requires sensing whether the channel bus is idle. If the channel bus is sensed to be idle a source computer transmits its message including a complete set of data to be sent and destination fields. If the channel bus is sensed to be busy, the source computer reschedules the message for some later time, picking a delay time from a retransmission distribution.

A second step is to see if the destination computer is ready to receive the message from the source computer by the source computer detecting an acknowledgement frame to be sent by the destination computer. If the source computer receives the acknowledgement frame sent by the destination computer, the source computer transmits the data to the destination computer. If the source computer senses a "receive not ready" state of the destination computer, the data is not transmitted, and the request for transmission the data of the source computer is rejected by the destination computer.

Finally, there is a step of terminating the connection between the source and destination computers, which includes the substep of sending a command for disconnecting the communication line between the source and destination computers. If computers in the networks accept a command DISCONNECTION contained in the packet sent by the source computer, they then begin to monitor the channel bus of the network.

FIG. 5 is a system diagram of the computer networks using the teaching of the present invention.

A bus network shown in FIG. 5 includes on collection of autonomous computers 20 each having an Interface Message Processor 22, a channel bus 26 shared commonly by the computers 20 for transmitting and receiving a message, with the bus 26 connected to the IFs 22 of the computers through the respective connecting interfaces 28, and a channel control unit 24 disposed on the line between 1F 22 and the connecting interface 28 for controlling the connection between the source computer having data to be sent and a destination computer.

Figure 1:
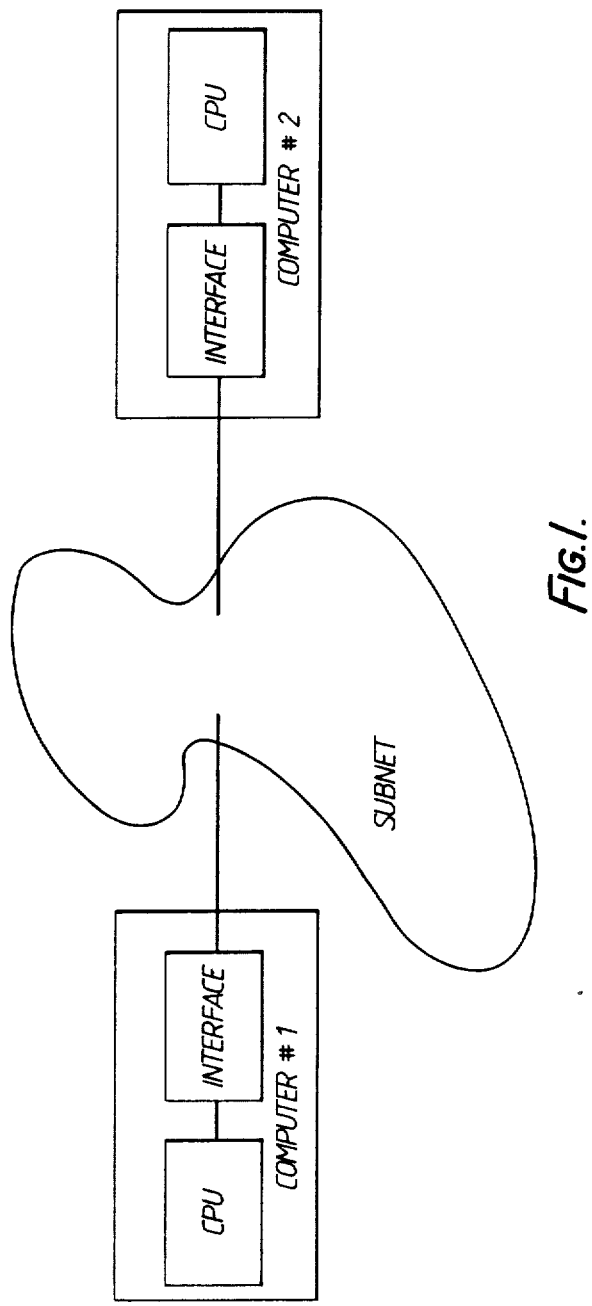
FIG. 1 is a schematic block diagram illustrating the allocation of a computer network system.
Figure 2:
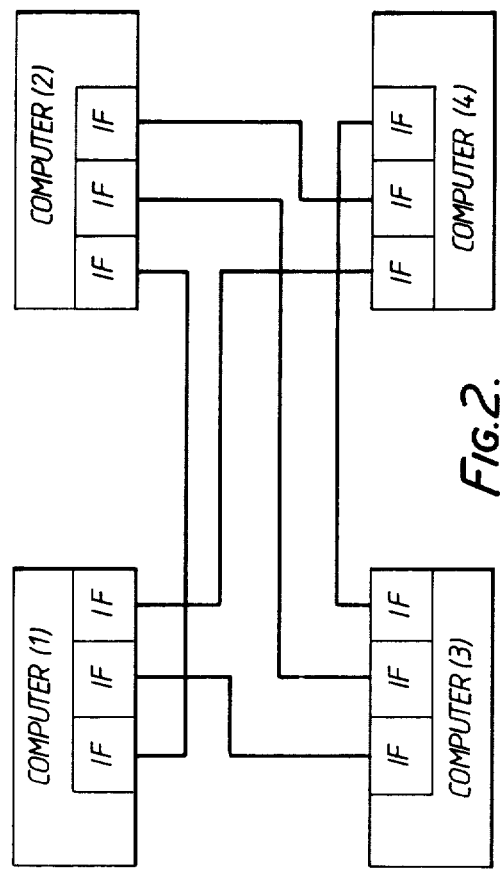
FIG. 2 is a block diagram illustrating a model of a point-to-point channel network system.
Figure 3:
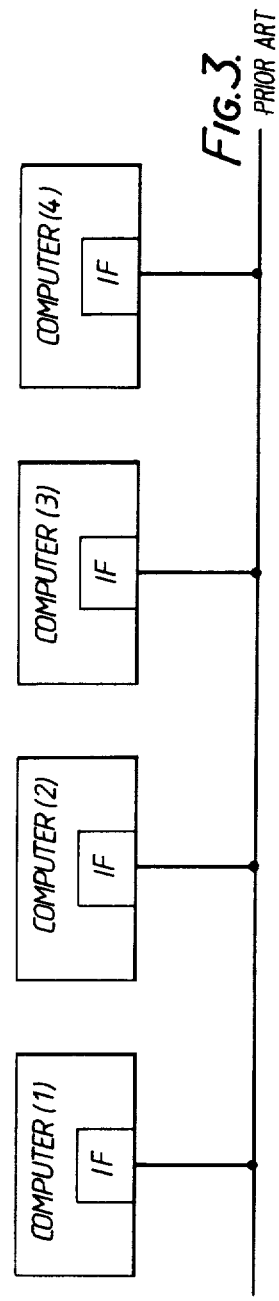
FIG. 3 is a block diagram illustrating a bus network as one model of a shared-transmit/receiver channel network system.
Figures 4, 6:
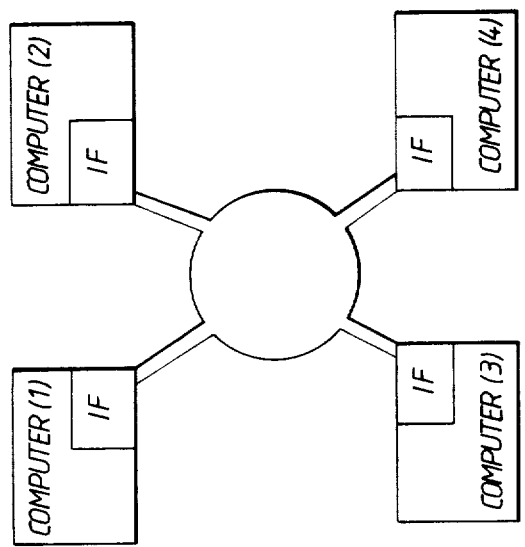
FIG. 4 is a block diagram illustrating a ring network as one model of a shared-transmit/receiver channel network system.
FIG. 6 is a diagram illustrating the frame structure exchanged between IF's of source and destination computers according to the invention.

The frame structure exchanged between IFs of the source and destination computers is shown in FIG. 6.

A frame is composed of four fields, excluding a special bit pattern called Flag 130 to delimit the frame, as described below.

The Destination field 132a and source field 132b are used for telling which computer the frame is going to and coming from. Each channel control unit 24 determines if the message is being directed to itself based on the transmitted destination field 132a, and which computer wants to transmit the message to the computer designated by the destination field of the frame, and what kind of data is transmitted corresponding to the source field 132b.

The control field 134 is used for sequence numbers, acknowledgements, commands, and other purposes.

The Information field 36 contains actual data to be sent, for example image data.

The CRC field 138 is a minor variation on the polynomial code (also known as a cyclic redundancy code), and is used for detecting a transmission error. The basic idea for detecting a transmission error using the polynomial code is to append a checksum to the end of the message which is divisible by a generator polynomial G(X). When the receiver gets the checksummed message, it tries dividing it by G(X). If there is a remainder, there has been a transmission error. There are international standards for the polynomials, one of which is:

$$G(X) = X^{16} + X^{12} + X^5 + 1$$

This polynomial is used for 8-bit characters, and detects all single and double errors, all errors with an odd number of bits, all burst errors of length 16 or less, almost all of 17-bit error bursts, 18-bit and longer bit error bursts.

As shown in FIG. 5, a number of connecting interfaces 28 are connected in series by means of a bus 26 shared by a number of computers 20. The channel control units 24 provide the necessary management and control of the switching network for establishing and removing connections between a given pair of IFs 22 for the purpose of allowing two computers to communication together.

Figure 7:
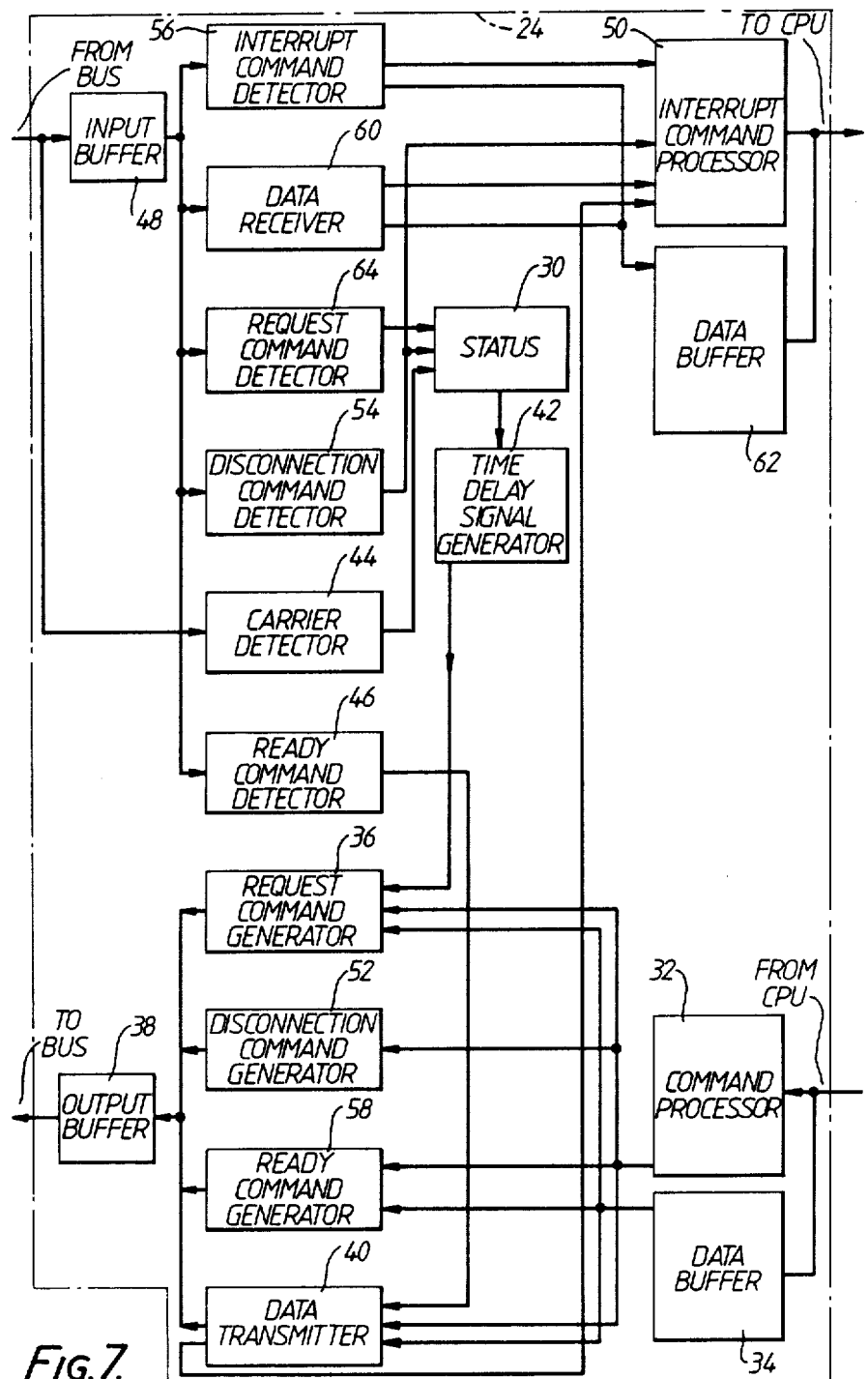
FIG. 7 is a block diagram of switching control circuit illustrating the teachings of the subject invention.

The block diagram of the channel control unit embodying the present invention is shown in FIG. 7. The channel control unit 24 connected to the respective IF 22 of each computer 20 monitors the bus 26 when it is not involved in communication with another computer 20 by looking for some command signals by means of an occupying status detector 30. When a source computer transmits data to a destination computer, the source computer having data to be sent transfers destination address information and command information to request connection to the designated destination computer to a command processor 32 of the channel control unit 24. Data buffers 34 allow for temporary holding of data while access by a source computer to bus 26 is being obtained. Request command generator 36 generates a request command signal to be provided to output buffer 38 corresponding to the request command information from the source computer.

When the level of the status detector 30 is low, a request command generated from the request command generator 36 is provided in the control field of a transmitted packet, and the destination address is incorporated as a destination address, and the source address is incorporated as a source address in the transmitted packet. The packet is produced based on the data to be sent by a data transmitter 40 to include the Destination and Source fields, Control field, CRC field as shown in FIG. 6 and is transmitted through the output buffer 38 to the bus 26.

When the level of the status detector 30 is high, the request command generator 36 prepares to retransmit based on an individual time delay corresponding to a time delay signal generated by a time delay signal generator 42. The individual time delay for the computer 20 is predetermined corresponding to the priority of communication between the source computer and the destination computer. After the request command generator 36 drops off and waits for the delay time decided by the respective time delay signal generator 42, transmission is then retried.

The network employs a carrier sense multiple access/collision detection (CSMA/CD) scheme with collision detection. Transmission is permitted when no carrier is sensed. When a carrier is sensed by a carrier detector 44, IF 22 of computer 20 drops off and waits until the transmission is permitted. Detection of the carrier is transferred through the status detector 30 to the time delay signal generator 42.

One of two modes is selected to set individual time delays. One mode is to activate the request command generator 36 with the time delay corresponding to the time delay signal generated from the time delay signal generator 42. Another is to activate the request command generator 36 without delay by the time delay signal generator 42. The former is called "normal" mode, the latter is called "urgent" mode.

Data transmitted to the bus 26 from the source computer is detected by the channel control unit 24 of the designated computer. When the designated computer is ready to receive data from the source computer, the ready signal generated by the ready command generator 46 in the channel control unit 24 of the designated computer is detected and supplied through the input buffer 48 to Ready command detector 46 in the channel control unit 24 of the designated computer. After the status of the designated computer is monitored, the source computer transmits data through output buffer 38 to bus 26. Data supplied from the source computer is transmitted to the designated computer on the bus 26.

In case that no data is in data transmitter 40, data transmitter 40 requests, by means of an interrupt command processor 50, the CPU of the source computer to supply data to be transmitted. According to the request from the data transmitter 40, the CPU of the source computer sends data to the data transmitter 40 in the channel control unit 24.

When the CPU has no further data to be transmitted after sending all the data to the data transmitter 40, a disconnection command signal generated by a disconnection command generator 52 is passed through output buffer 38 to the bus 26. The disconnection command generator 52 is initiated by command processor 32 based on a command of the CPU. The disconnection command is contained in the control field of the frame to be sent.

A source computer that is waiting for communication with another destination computer detects the disconnection command contained in the frame transmitted on the bus 26 by means of disconnection command detector 54. After detecting the disconnection command in the transmitted frame, the source computer having data to be sent waits for the predetermined delay time, and then provides on the bus 26 a request command generated from the request command generator 36 through output buffer 38.

The general functional operation of the channel control unit 24 is described below referring to FIG. 7. In operation, when one computer is requested to receive data from another computer, an interrupt command detector 50 of the requested computer is supplied a request command generated by the request command generator 36 of the requesting computer. The interrupt command detector 56 supplies an Interrupt command by means of the Interrupt command processor 50 to the CPU itself. If the CPU is ready to accept data to be transmitted from the requesting source computer, the CPU operates the ready command generator 58 to send a ready command signal through output buffer 38 on the bus 26.

The designated requested computer receives the ready command signal by means of the ready command detector 46 in its associated channel control unit 24, and is then enabled to receive data from the source computer. Data transmitted on the bus 26 is supplied through the input buffer 48 to a data receiver 60 in the channel control unit 24. Data received in data receiver 60 is transmitted through a data buffer 62 to the CPU of the destination computer in order to be processed.

If the CPU is not ready to accept data, the CPU does not operate, and rejects the request command transmitted on the bus 26 from the requesting source computer having data to be sent.

As earlier mentioned, when the data transmission between the source and destination computers is finished, the disconnection command signal is transmitted from the source computer onto the bus 26. The designated computer detects the disconnection command by the disconnection command detector 54, and the level of the status detector 30 becomes low in its channel control unit 24. Then the designated computer again looks for command signals, and monitors the bus 26. In case that a request command detector 64 receives the request command signal from another source computer, the level of the status detector 30 in the channel control unit 24 of the designated computer becomes high. Furthermore, the carrier detector 44 of the channel control unit 24 neither senses a carrier, nor accepts data for a predetermined period, in the event that the level of the status detector 30 becomes low. Therefore, the previously designated computer returns to looking for command signals by means of the status detector 30 in its channel control unit 24.

Various modifications and variations will no doubt occur to those skilled in the various arts to which this invention pertains. For example, the data transmission may be continued without checking whether the designated computer is ready to accept data transmission by using a ready command signal for each transmission until all the data is transmitted. Also, if the disconnection command on the communication between a pair of communicating computers is detected by the disconnection command detector 54, the computer detecting the disconnection command may send a request command with a time delay determined based on the adaptive randomization strategy employed by Ethernet, described in Commun. ACM, vol. 19, pp. 395–404, July 1976. The symbol corresponding to the priority of the communication between a pair of computers may be contained on the lead portion of the data frame to be transmitted, instead of the delay corresponding to the priority. As long as the frame containing this symbol exists, the data transmission between the computers defined in the destination and source address in the frame lasts.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A data communication computer network system comprising:
   a shared serial high speed communication channel for carrying switched information;
   a plurality of autonomous computers for using said shared channel; and
   a plurality of channel control means for coupling respective computers to said shared channel, for receiving information from a computer for assembly into plural data packets for transmission on said shared channel, and for receiving said data packets from said channel for disassembly into data to be transmitted to a computer;
   said channel control means comprising:
   data transfer means for transmitting and receiving information over said shared channel,
   command means coupled to said data transfer means for establishing and preserving a point-to-point communication line for successively communicating said plural data packets, without interruption, until completion of transmission of all said plural data packets to be transmitted on the preserved point-to-point communication line from a source computer to a destination computer and for removing said point-to-point communication line upon completion of transmission of all said plural data packets, said command means comprising means for sending a multi-bit disconnection signal to said shared channel to be received by said destination computer and all other computers connected to the shared channel to indicate that all said plural data packets have been transmitted and that the shared channel is available for transmission of data by any other computers connected to the shared channel, and
   status means coupled to command means for monitoring the status of said shared channel and operating said command means in correspondence with the status of said shared channel.

2. A data communication computer network system as recited in claim 1, wherein said channel control means comprises:
   time delay means for delaying connection of said respective computer to said shared channel for a predetermined time delay, said time delay means being responsive to the status of said shared channel.

3. A data communication computer network system as recited in claim 2, wherein said channel control means comprises:
   interrupt command means for managing the reception and transmission of information by each said respective computer.

4. In a data communication computer network system arranged to interconnect autonomous computers by means of a shared serial communication channel, the method of exchanging information comprising the steps of:
   sensing whether said shared channel has an idle status or a busy status;
   determining when said shared channel idle status is sensed whether a designated computer is ready to receive information from a source computer;
   establishing a point-to-point communication line between the designted computer and the source computer when it is determined that said designated computer is ready to receive said data packets and preserving said point-to-point communication line while uninterruptedly transmitting all of the data packets until the last of the data packets is transmitted;
   terminating information transmission and removing said point-to-point communication line when transmission of said plural data packets is completed, including sending a multi-bit disconnection command for disconnecting said communication line over said shared channel after transmission of the last of said data packets, thereby immediately making the shared channel available for data transmission by any computer connected thereto; and
   sensing said shared channel again.

5. The method according to claim 4, wherein said sensing steps comprises the steps of:
   transmitting said data packets only if said idle status of said channel is sensed;
   rescheduling transmitting of said data packets for a predetermined later time if said busy status of said channel is sensed; and
   retrying transmitting of said data packets after a predetermined delay time corresponding to said later time.

6. The method according to claim 4, wherein said determining step comprises the steps of:
   transmitting a request command to said designated computer from said source computer;
   transmitting an acknowledgement signal from said designated computer to said source computer upon reception of said request command by said designated computer only if said designated computer is ready to receive information; and transmitting said data packets to the designated computer if the acknowledgement signal is received.

7. A data communication computer network system according to claim 1, comprising:
- the command means of each computer comprising means for sending a message including a source field identifying the respective computer as a source computer and a destination field identifying the destination computer;
- the channel control means of each computer comprising means for detecting the destination field and identifying if the respective computer is a destination computer, and means for sending an acknowledgement signal to the shared channel and thereby to the source computer when it is determined by said respective computer that the respective computer is a destination computer; and
- said command means comprising means for detecting said acknowledgement signal send from the destination computer and immediately after detecting said acknowledgement signal initiating successive and uninterrupted transmitting of all said data packets.

* * * * *